No. 663,028. Patented Dec. 4, 1900.
A. HERSCHMANN.
SELF PROPELLING VEHICLE.
(Application filed Mar. 19, 1900.)
(No Model.) 3 Sheets—Sheet 1.
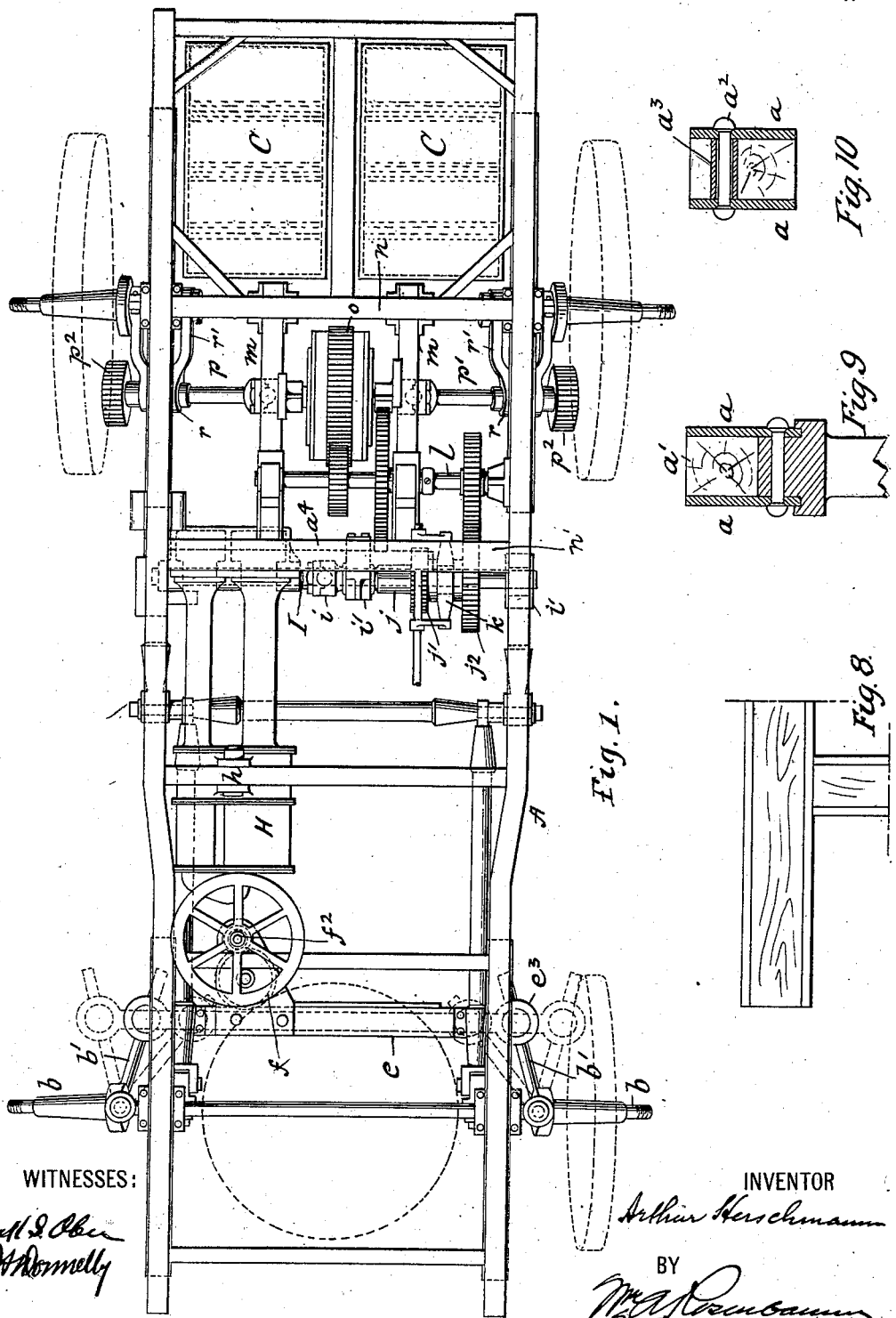
WITNESSES: INVENTOR
Arthur Herschmann
BY
ATTORNEY

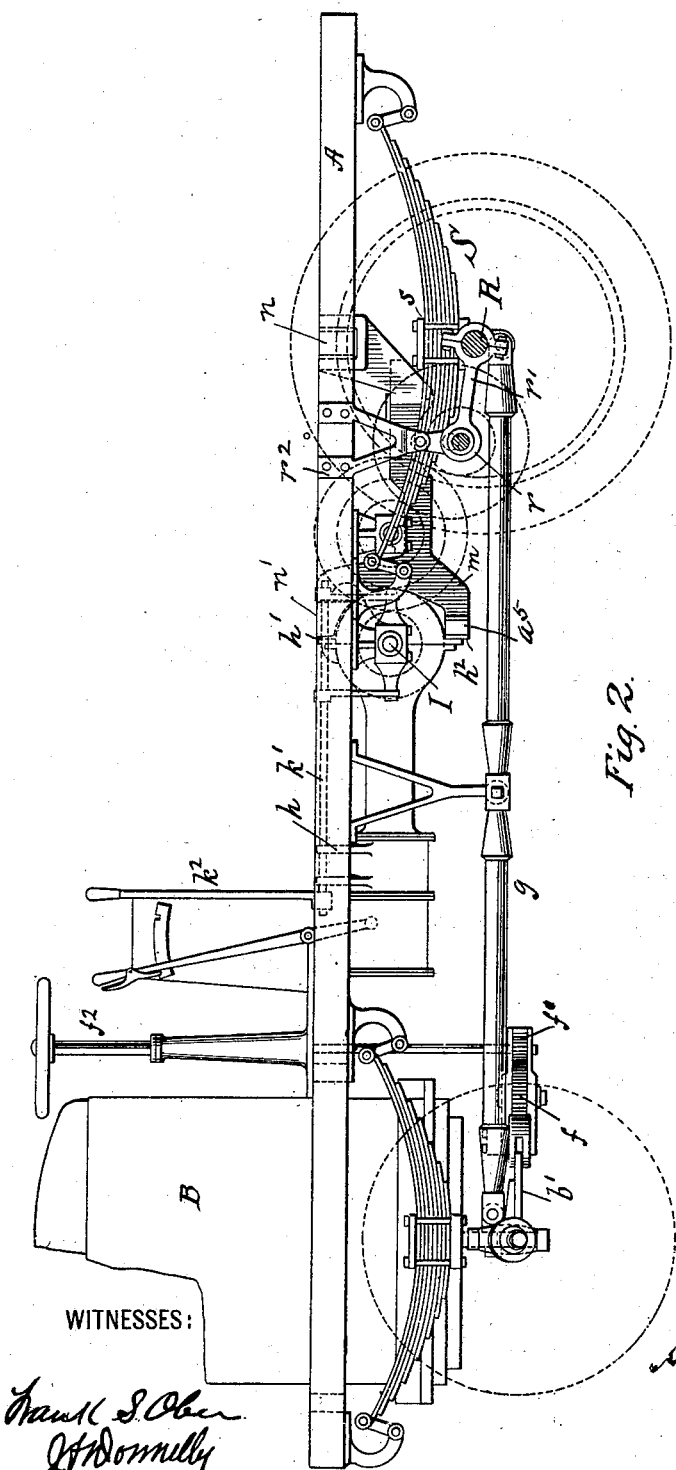

No. 663,028. Patented Dec. 4, 1900.
A. HERSCHMANN.
SELF PROPELLING VEHICLE.
(Application filed Mar. 19, 1900.)
(No Model.) 3 Sheets—Sheet 3.
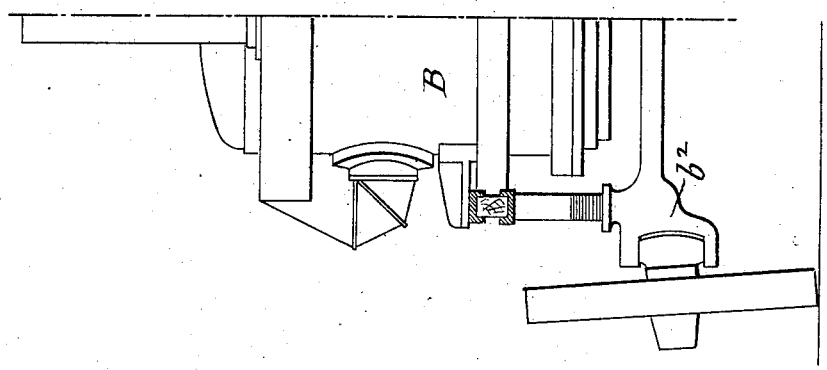
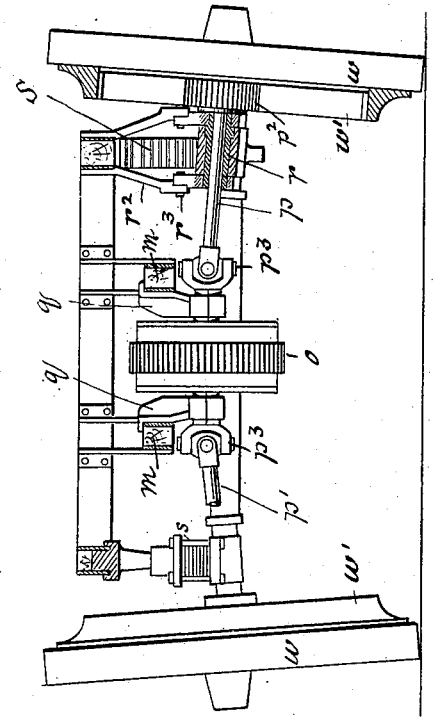
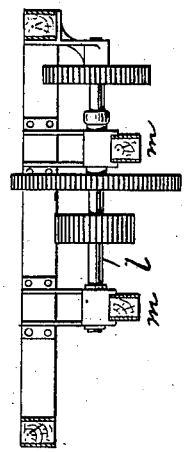
WITNESSES: INVENTOR
Arthur Herschmann
BY
ATTORNEY

UNITED STATES PATENT OFFICE.

ARTHUR HERSCHMANN, OF NEW YORK, N. Y., ASSIGNOR TO L. C. WEIR, OF SAME PLACE.

SELF-PROPELLING VEHICLE.

SPECIFICATION forming part of Letters Patent No. 663,028, dated December 4, 1900.

Application filed March 19, 1900. Serial No. 9,279. (No model.)

*To all whom it may concern:*

Be it known that I, ARTHUR HERSCHMANN, a subject of the Emperor of Austria-Hungary, residing at the city of New York, borough of Manhattan, State of New York, have invented certain new and useful Improvements in Self-Propelling Vehicles, of which the following is a full, clear, and exact description.

This invention relates to self-propelled vehicles, and has special reference to heavy trucks for carrying freight.

The object of the invention in general is to provide a structure and method of mounting the various parts of the power devices thereon which will resist strains and which will be easy to control as to the motive devices.

To this end the invention consists, primarily, of details of construction relating to the mounting of the engine, the suspension of the gearing, and the transmission of the power to the driving-wheels.

Other details are also involved which will be brought out in the description and claims which follow.

In the accompanying drawings, Figure 1 is a plan of the frame of the vehicle, showing the steering and power devices mounted thereon. Fig. 2 is a side elevation. Fig. 3 is a rear end elevation with parts in section and other parts broken away. Fig. 4 is a front end elevation of one-half of the vehicle. Fig. 5 is a section through the frame of the vehicle, showing the counter-shaft in elevation. Fig. 6 is a detail of the steering-rack and box. Fig. 7 is a detail of the steering-gear, and Figs. 8, 9, and 10 are side and sectional views of the frame.

The main frame A is a rectangular structure made up of longitudinal and cross pieces consisting of metal plates $a$, between which is a filling of wood $a'$, the plates being bolted together through the wood by means of bolts $a^2$, surrounded by sleeves $a^3$. This construction gives a strong and light frame and one which does not readily transmit vibrations.

At the forward end of the vehicle a steam-boiler B is carried, but this has no part in my invention. At the rear of the frame are placed two rectangular tanks C, which carry a supply of water for the boiler. In these tanks are placed transverse inclined screens or perforated sheets $c$ (indicated in dotted lines) for the purpose of preventing the surging of the water in a longitudinal direction and when the speed of the vehicle is suddenly altered.

With reference to the steering-gear it will be seen that the forward wheels are mounted on stud-axles $b$, which form one arm of a bell-crank pivoted vertically in the yoke $b^2$, attached to the frame. The other arm of the bell-crank (indicated by $b'$) extends rearward at an angle somewhat greater than a right angle. Mounted horizontally and transversely of the vehicle and beneath the main frame is an elongated rectangular box $e$, in which is located a bar $e'$, having a short rack $e^2$ on its rearward face. This rack is exposed through an opening in the back of the box, so that it may be engaged by a gear-wheel $f$. Each end of the bar projects beyond the box and has formed upon it an eye $e^3$ $e^4$. At opposite points in the sides of these eyes slots $e^5$ are formed, and in the opening of each eye is placed a disk $e^6$, having a diametrical hole through it. The arms $b'$ of the bell-cranks pass, respectively, through the slots and the disk in the eyes of the bar. It will therefore be seen that when the bar is caused to slide in either direction through its box both bell-cranks will be moved simultaneously, and the vehicle will be given a corresponding change in direction of movement. The positions of the arms $b'$ of the bell-cranks with respect to the ends of the rack-bar are such that the vertical planes of the two arms will always intersect in the vertical plane of the rear axle. This is known to be essential for good steering. Hence the sliding connection between the ends of the rack-bar and the arms $b'$ permit the arms to move through different angles, which is necessary in order to secure the steering conditions above mentioned. The gear-wheel $f$ is rotated by a pinion $f'$ at the lower end of a vertical shaft $f^2$, to which a hand-wheel is attached.

The rack-box is supported between two fore-and-aft braces $g$ and $g'$, which transmit the stresses between the two axles.

I will next refer to the mounting of the engine. The engine is indicated by H. It is arranged horizontally and is supported practically at three points. One of these points is at $h$ and consists of a single bolt passing through ears cast onto the engine-frame through a cross-piece of the frame. The other two points of support are at the rear end of the engine-frame and above and below the same, (indicated by $h'$ and $h^2$ in Fig. 2,) the upper support being on the cross-piece $a^4$ and the lower support on the cross-piece $a^5$, which extends only part way across the vehicle. By placing the engine to one side of the central line of the vehicle many strains are avoided, and by supporting the engine at three points and allowing a certain amount of play at each point, which is the case, the engine is free to accommodate itself to the slight twistings of the frame which occur in practice.

The engine-shaft is indicated by I. It extends across the frame and is provided with a flexible joint $i$, permitting it to bend slightly with the frame, and it is mounted in brackets $i'$, depending from the main frame. A part of this shaft at $j$ is square, and on this part are two sliding gear-wheels $j'$ and $j^2$, which are movable together, so that one of them may be thrown out of gear with its mate, while the other is thrown into gear with its mate. The shifting device is a yoke $k$ between the two gears, which is adapted to be moved by rocking the shaft $k'$ by means of the hand-lever $k^2$. Back of the shaft I is a counter-shaft $l$, mounted in bearings $l'$, fixed upon short parts $m\ m$ of the frame, running fore and aft of the vehicle. This counter-shaft also has a bearing in a bracket depending from one of the side pieces of the main frame. The counter-shaft carries three gear-wheels, two of which are the mates, respectively, of the wheels $j'$ and $j^2$, while a third one is in engagement with a gear $o$. This last-mentioned gear is adapted to drive two independent shafts $p$ and $p'$, and by means of a construction well known and of which the said gear forms a part the two shafts are permitted to run at different speeds when required.

The rear axle R is bent near each end, so that the studs upon which the wheels are hung will support the wheels in an outwardly-inclined position. Each rear wheel $w$ carries an internal gear $w'$, which gears are driven by the respective shafts $p$ and $p'$ through pinions $p^2$ on said shafts. Since the internal gears $w'$ are in an inclined plane, the shafts $p$ and $p'$ are necessarily inclined to positions at right angles to such plane, and for this reason universal joints $p^3$ are interposed between the shafts and the differential gear $o$, which drives them. The support of the outer end of the shafts $p$ and $p'$, which must be provided to keep the pinions $p^2$ in mesh with the internal gears, consists of a bearing $r$ at the end of an arm $r'$, which is in the form of a fork, the members of which are pivoted upon the rear axle on each side of the clip $s$ which supports the spring S. This portion of the axle is tilted to the same angle as that occupied by the shaft, so that the slight movements to which the shaft is subjected are permitted without straining the shaft. When the pinions turn in the direction to propel the vehicle forward, the resistance or work required to be done imparts a tendency in the pinions to climb upward on the internal gears, and to prevent this the bearing $r$ is connected with one of the side pieces of the main frame by the brackets $r^2$, which are hinged to the bearing at $r^3$. These brackets therefore support the end of the shaft when the vehicle is not moving, and when moving backward they provide for the compression of the springs in the effort of moving the load. They also prevent the upward thrust in propelling forward. Another important advantage in connecting the bearing of the pinion with the main frame is that in starting up the tendency of the pinion to mount or climb up on the internal gear is resisted by the load on the vehicle, and the engine therefore has a substantial force to work against as a purchase in starting.

The inner ends of the shafts $p$ and $p'$ beyond the couplings, together with the differential gear device $o$, is supported by means of brackets $q\ q$, which depend from the frame-pieces $m\ m$. These frame-pieces extend between the cross-piece $n$ at the rear and the two cross-pieces $n'$ and $a^5$ forward. The front ends of the pieces $m$ are branched, as shown in Fig. 2, to connect with both of the pieces $n'$ and $a^5$. This affords a rigid structure for the support of the gearing.

Having described my invention, I claim—

1. In a self-propelling vehicle the combination with the main frame and an engine attached thereto at two points on its upper side and one point on its lower side, substantially as described, and for the purpose set forth.

2. In a self-propelling vehicle, the combination of a main frame, an engine or motor located on one side of the center line thereof, a shaft extending transversely of the main frame, gearing on one end of said shaft and connected to the drive-wheels, the engine being connected at the other end of the shaft and a flexible joint in the shaft located between said gearing and the engine.

3. In a self-propelling vehicle, the combination of a driving-wheel inclined from the vertical position, an axle therefor a pinion engaging said driving-wheel, the axis of the pinion and the axle being tilted to stand at right angles to the plane of the wheel, and an arm pivoted upon the axle and supporting the pinion, substantially as described.

4. In a self-propelling vehicle, the combination of two driving-wheels, two inclined shafts carrying pinions engaging with the driving-wheels, a gear-wheel connected with each of said shafts, a universal joint in each shaft, brackets supporting the gear-wheel and two frame-pieces from which said brackets depend, substantially as described.

In witness whereof I subscribe my signature in presence of two witnesses.

ARTHUR HERSCHMANN.

Witnesses:
WM. A. ROSENBAUM,
J. S. DONNELLY.